United States Patent [19]

Wright et al.

[11] Patent Number: 5,058,079

[45] Date of Patent: Oct. 15, 1991

[54] GEOPHYSICAL EXPLORATION USING VELOCITY PICKING FROM TRIAL VELOCITY FUNCTION SORTED TIME-COHERENCY TRACES

[75] Inventors: James H. Wright; Richard C. Heiser, both of Tulsa, Okla.; John H. Caldwell, Katy, Tex.

[73] Assignee: Amoco Corporation, Chicago, Ill.

[21] Appl. No.: 618,544

[22] Filed: Nov. 27, 1990

[51] Int. Cl.$^5$ .......................... G01V 1/34; G01V 1/30
[52] U.S. Cl. ........................................ 367/59; 367/38; 367/68; 364/421
[58] Field of Search .................... 364/421; 367/50, 59, 367/68, 38

[56] References Cited

U.S. PATENT DOCUMENTS 4,984,220  1/1991  Bodine et al. ..................... 367/68
5,008,861  4/1991  Gallagher ........................... 367/59

Primary Examiner—Ian J. Lobo

[57] ABSTRACT

Time-coherency traces generated during velocity analysis are displayed in panels where each panel contains traces representing a single selected trial stacking velocity function and a plurality of common midpoint locations along a seismic line of exploration. Points selected from the panels, optimally by comparison with stacked sections, are used to generate a time velocity funtion for stacking, NMO correction, interval velocity determination, or other uses.

16 Claims, 6 Drawing Sheets

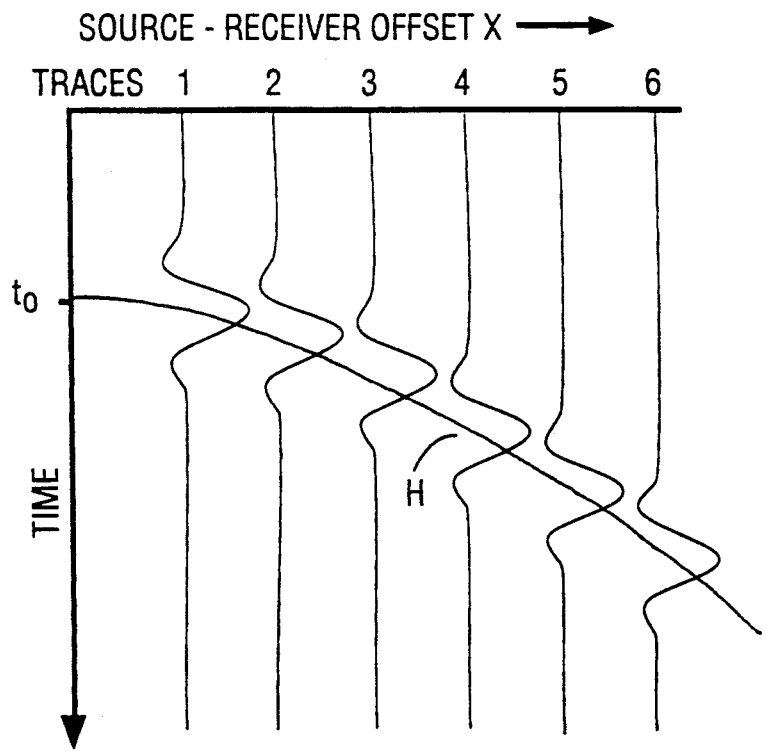
FIG. 1A - PRIOR ART
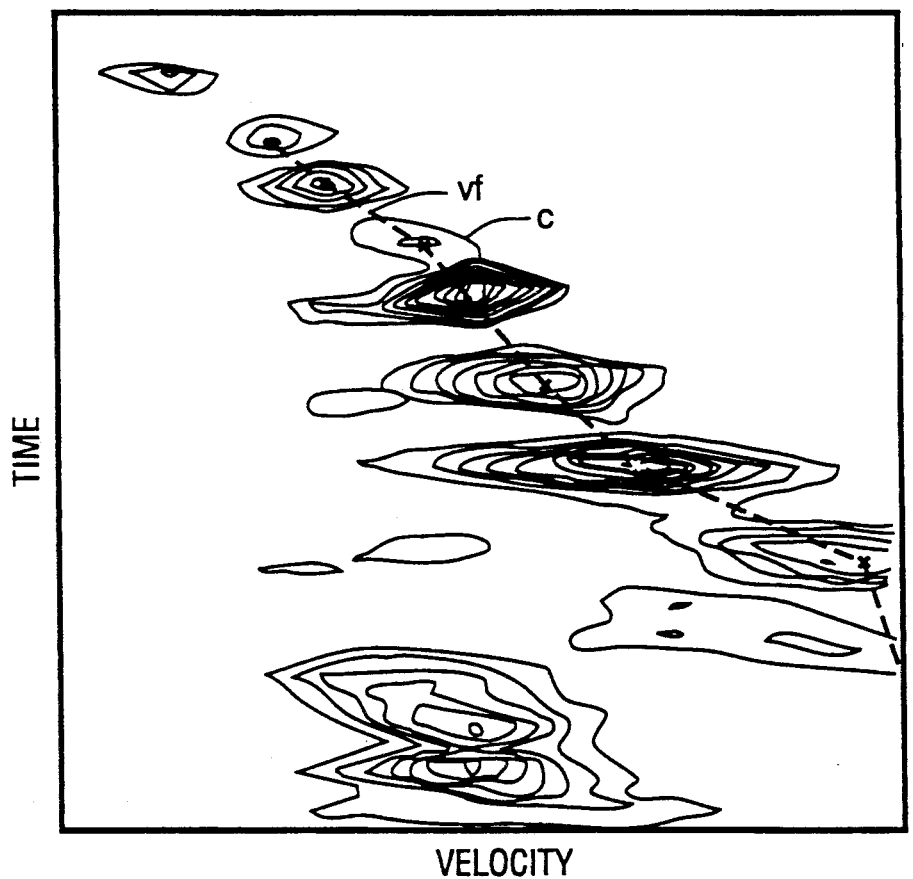
FIG. 1B - PRIOR ART

GEOPHYSICAL EXPLORATION USING VELOCITY PICKING FROM TRIAL VELOCITY FUNCTION SORTED TIME-COHERENCY TRACES

FIELD OF THE INVENTION

The invention relates to the processing and interpretation of seismic traces and relates in particular aspects to velocity analysis for determining velocity functions for normal moveout correction, interval velocity determination and for other uses.

SETTING OF THE INVENTION

Velocity analysis of common midpoint (CMP) gathers of seismic traces to generate stacking velocity functions and other velocity functions is extensively practiced and numerous techniques using velocity spectra are available. Nevertheless, under some circumstances, techniques using velocity spectra are inadequate because of poor quality of velocity spectra and alternatives are required. A new alternative technique is provided and described below beginning with the Summary of the Invention. The following preliminary discussion discusses the setting of the invention and the problems to which it is directed.

The CMP gather technique of seismic exploration facilitates identification of primary reflections against a background of noise. A CMP gather represents multifold seismic traces obtained for a location in the subsurface repeatedly sampled by seismic initiations (shots) at different source locations while an array of receivers is stationary or is rolled past the location.

The resulting set of seismic traces can be processed in various ways. In particular, the seismic traces can be processed to provide various measures of the velocity at which seismic waves travel in the earth as a function of depth. The process of determining a stacking velocity or other velocity function for the stacking of CMP gathers or for more detailed velocity determinations is referred to as velocity analysis. The velocity that most readily can be derived from seismic traces is the stacking velocity. The desired stacking velocity is that producing maximum coherency in primary reflection data. Stacking velocity can be related to NMO velocity which in turn can be related to RMS velocity from which average and interval velocities such as Dix interval velocity can be derived. The explorationist can derive also other velocities of interest.

Velocity analysis is essentially a "trial and error" procedure to determine time corrections necessary to align reflections recorded at a common mid-point with varying source-receiver distances (offsets). If traces of a CMP gather are plotted in order of increasing offset in the time-offset domain, reflections appear to lie along approximately hyperbolic paths (illustrated by line H in FIG. 1A-PRIOR ART).

Normal moveout (NMO) is the time shift that must be applied to a reflection time $T_x$ of a seismic signal received by a receiver having offset X to reduce it to the time $T_O$ that would have been recorded at zero offset (normal incidence), that is: $\Delta T_{NMO}$ can be determined by:

$$\Delta T_{NMO} = T_x - T_O$$

For each trial stacking velocity, V, $\Delta T_{NMO}$ corrections are applied to each of the traces of the CMP as a function of time (or depth) according to $$\Delta T_{NMO} = \left( T_0^2 + \frac{X^2}{V^2} \right)^{\frac{1}{2}} - T_0 \tag{1}$$

or a similar relationship.

One approach to velocity analysis is for the analyst to specify a number of trial velocity functions (TVFs). A velocity function is a function representing variations in seismic velocity as a function of time. A trial velocity function is one of a plurality of hypothetical velocity functions selected by an explorationist.

A set of TVFs is schematically illustrated in FIG. 3 where each of the diagonal lines labeled TVF1-TVF5 is such a TVF. Trial velocity functions can be selected by an explorationist for evaluation based on previous experience, geological similarity, or on a trial and error basis. Generally, a large number of TVFs are examined for each CMP gather. The user may specify the TVFs directly or may specify the velocities for the first TVF and the incremental velocity $\Delta V$ to be added to each TVF for computing the next TVF. For each TVF, coherency values are computed at closely sampled time increments by NMO correcting the traces in the CMP gather for each TVF and time and measuring coherency using any convenient measure of coherence, e.g., semblance.

An alternative approach to velocity analysis systematically varies trial stacking velocity and time over a selected stacking velocity-time domain without the use of prespecified TVFs, NMO corrects the traces in the CMP gather for each trial stacking velocity-time pair, and measures resulting coherency.

The result of velocity analysis is a set of time, velocity, coherency data which can be used and displayed in various ways.

Velocity spectra are frequently used for displaying the results of velocity analysis. A velocity spectrum is a display of coherency measures corresponding to various assumed values of times and velocities. In velocity spectra, the coherency values as a function of time and velocity can be represented, for example, by contouring measures of coherency on plots in which time varies along one axis and velocity varies along the other. Such a velocity spectrum is illustrated in FIG. 1B—PRIOR ART. Numerical tables of the measured coherency values as a function of times T and velocities V are sometimes also printed out and used. The maximum coherency over the range of velocities for each time increment may also be displayed as a trace referred to as a maximum coherency trace.

Generally, velocity analysis is performed for multiple CMPs of interest along a seismic line of exploration and velocity spectra and other displays are produced for each CMP of interest.

Velocity spectra can be used for selecting a stacking velocity function for NMO correction and other uses by selecting regional coherency maxima or peaks such as illustrated by points X on FIG. 1B and using the peak picks to define a velocity function, for example, a stacking velocity function such as illustrated by the dashed line labeled vf in FIG. 1B. Such velocity functions can be generated at intervals, i.e., for different CMPs, along the seismic line.

While the velocity spectrum illustrated in FIG. 1B illustrates a clear trend of coherency peaks, such is frequently not the case. Seismic traces are frequently of low quality, that is, of a poor signal to noise ratio. Also, seismic data frequently include events representing multiple reflections and spurious events while primary reflections which are of great interest may be suppressed. In such cases, selecting stacking velocity functions from velocity spectra becomes difficult or impossible and alternate techniques are required.

SUMMARY OF THE INVENTION

A time-coherency trace is a trace generated by processing CMP gathers which represents variation in measures of coherency as a function of time for a given CMP for one of a plurality of selected TVFs. High coherency events on time-coherency traces are representative of sub-surface structure, and are used in accordance with the invention to aid in velocity analysis and interpretation. Specifically, time, velocity pairs for generating a velocity function are selected from TVF panels (defined below) comprising time-coherency traces for multiple CMPs.

Thus, according to the invention, from velocity analysis of a plurality of CMP gathers along a seismic line of exploration, there is generated a corresponding plurality of sets of time-coherency traces. Such a plurality of sets of time-coherency traces for a plurality of CMPs is sorted on a TVF by TVF basis to produce TVF-sorted sets of time-coherency traces. Each TVF-sorted set of time-coherency traces thus represents time-coherency traces of a plurality of CMP gathers for one particular TVF. At least some of the resulting TVF-sorted sets of time-coherency traces are displayed on a computer monitor on a TVF by TVF basis in TVF panels. Each TVF panel thus is a display of a TVF sorted set of time-coherency traces for a plurality of CMP gathers for one particular TVF. Time values corresponding to high coherency events are selected from the TVF panels and are used for generating a velocity function.

According to further aspects of the invention, selected intervals of CMPs along the seismic line and/or selected TVFs can be used for generating such displays of TVF panels. Such displays can also be used in conjunction with various stacked sections for selecting time values in the TVF panels for generating the velocity function. In a particular aspect, the stacked section is a section of stacked time-coherency traces where each stacked trace is produced by stacking a set of time-coherency traces for a CMP gather.

Other aspects, features and advantages of the invention will be apparent from the following description and the drawings.

BRIEF DESCRIPTION OF THE DRAWINGS

FIG. 1A—PRIOR ART illustrates schematically a CMP gather and an optimum stacking velocity function H for NMO correction thereof.

FIG. 1B—PRIOR ART illustrates schematically a velocity spectrum produced from velocity analysis of a CMP gather and a stacking velocity function vf selected therefrom.

The invention will be further understood and appreciated from the following description.

DESCRIPTION OF THE INVENTION

Figure 2:
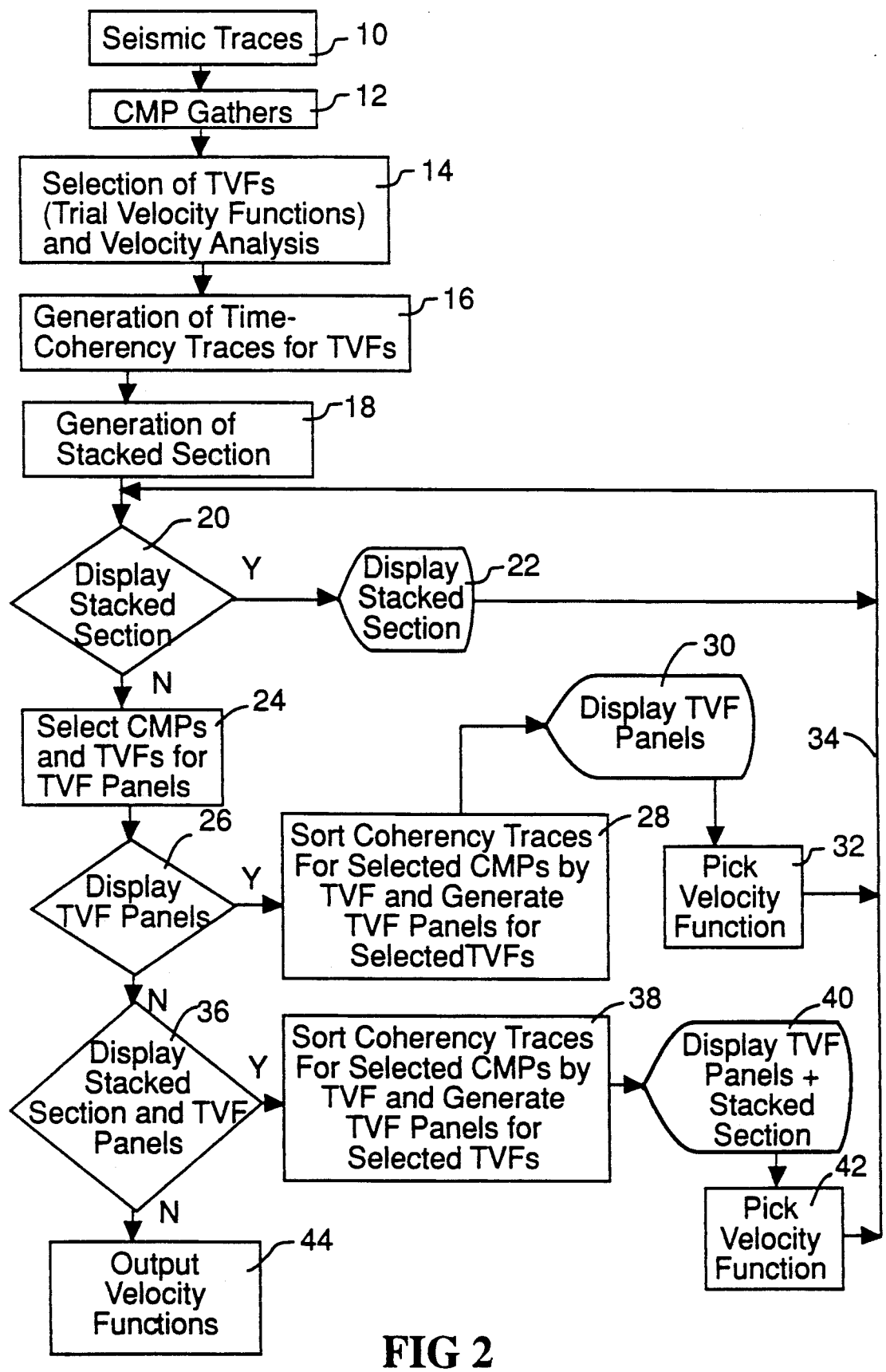
FIG. 2 represents a simplified flow diagram for illustrating the invented method and apparatus.
Figure 6:
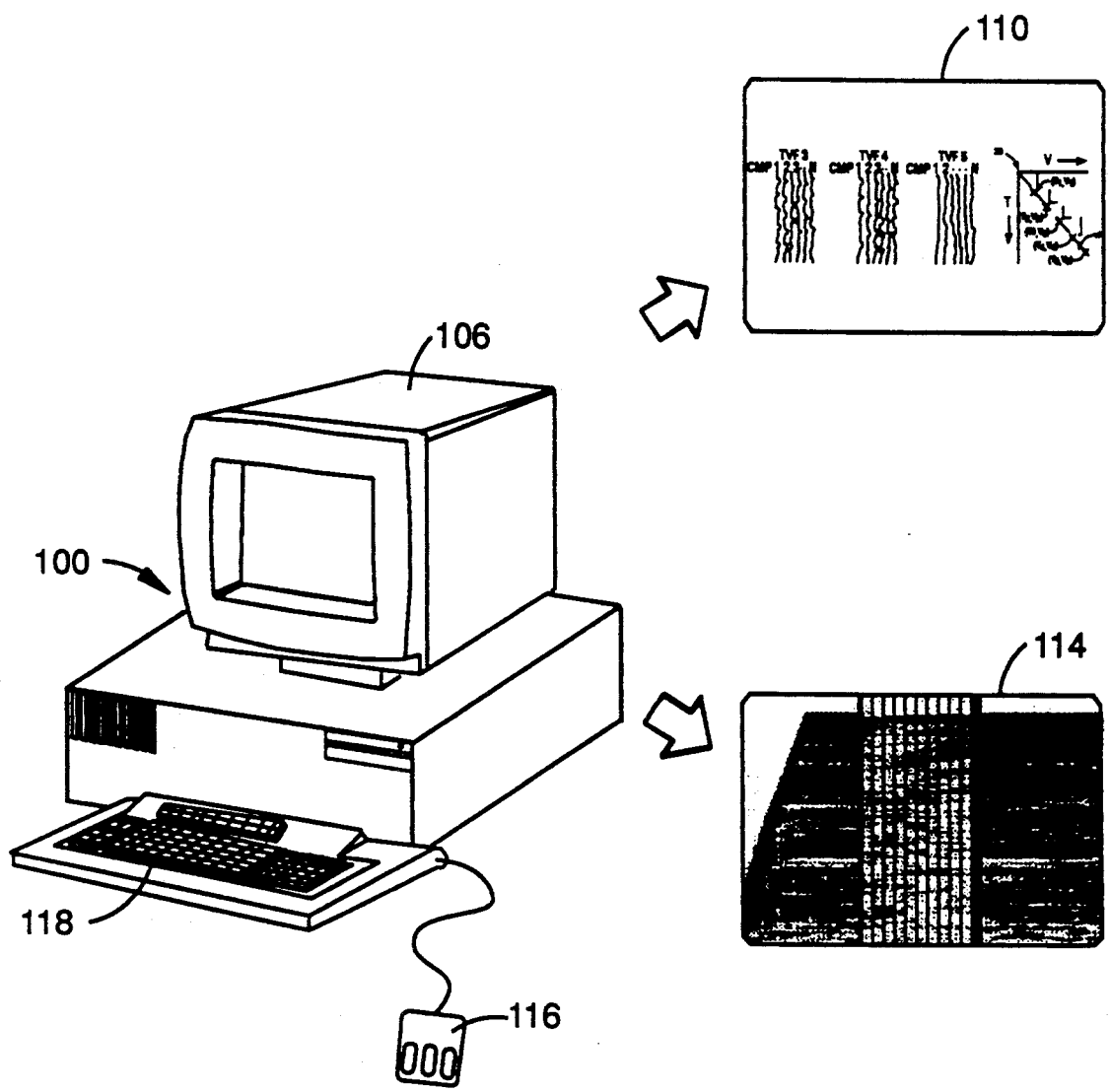
FIG. 6 illustrates apparatus for practicing the invention.

FIG. 2 is a simplified flow diagram illustrating the invented method and FIG. 6 is a simplified drawing illustrating the apparatus. From the description herein, persons skilled in geophysical exploration and geophysical data programming will be able to appropriately program a computer to carry out the required steps and generate the required displays.

Referring now to FIG. 2 in detail, velocity analysis of a plurality of seismic traces 10 sorted into CMP gathers 12 for positions X along a seismic line of exploration produces a set of time, velocity, coherency data 14 which are used to generate time-coherency traces for a selected set of trial velocity functions.

The word "sort" is used in its generally accepted meaning to refer to arranging data according to rules dependent on a key or index contained in the data. It will be appreciated by those skilled in the art of computer programming that sorting is merely an index management task.

Any suitable method of velocity analysis known to those skilled in the art can be used for steps 10, 12, and 14. The invention is particularly advantageous when used with a method of velocity analysis such as described above in the Setting of the Invention in which the explorationist specifies TVFs.

Figure 3:
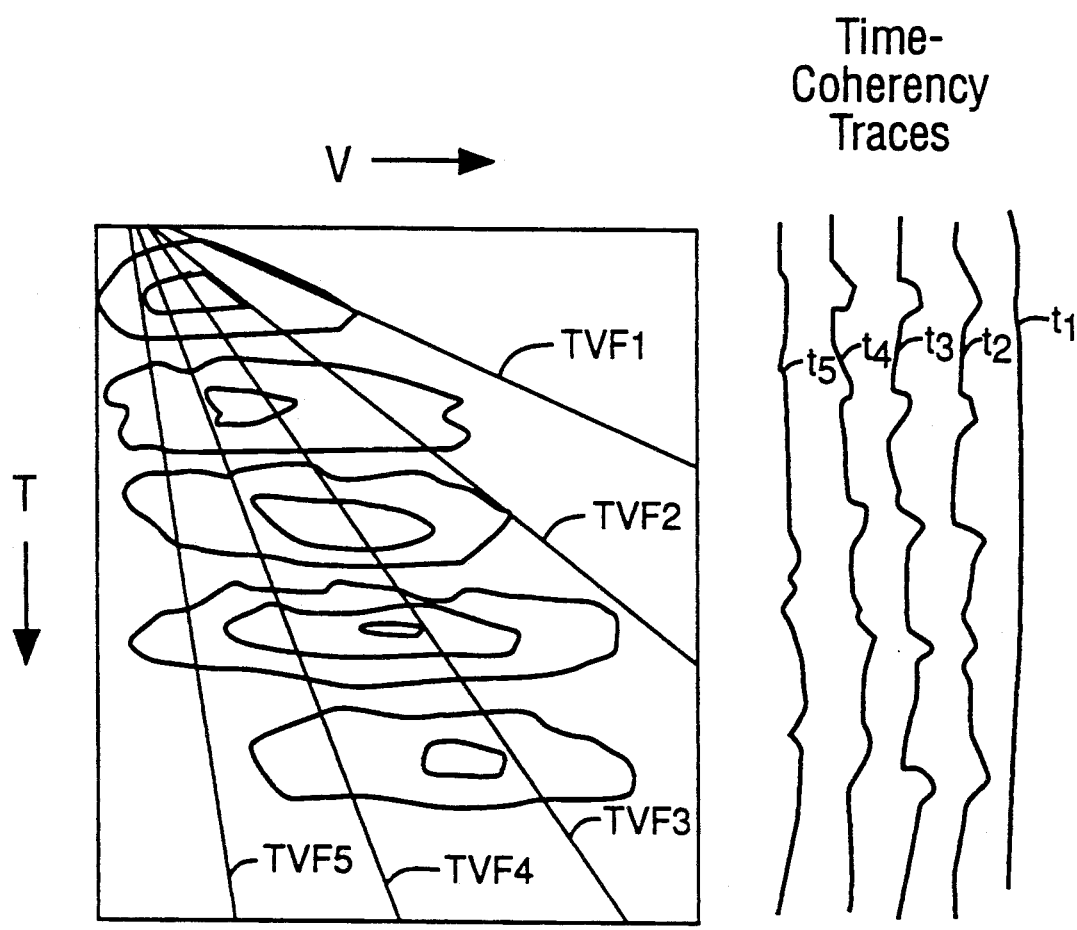
FIG. 3 schematically illustrates generation of time-coherency traces using a set of trial velocity functions (TVF), superimposed on a velocity spectrum.

Referring now to FIG. 3, FIG. 3 schematically illustrates the relationship between trial velocity functions TVF1–TVF5 and time-coherency traces $t_1$–$t_5$, respectively and illustrates generating time-coherency traces.

Time-coherency trace $t_1$ is an alternative way of displaying the time and coherency measurements of the velocity spectrum corresponding to TVF1, i.e., at time, velocity points defined by TVF1. Correspondingly, traces $t_2$–$t_5$ display the results of velocity analysis for functions TVF2–TVF5. Since the TVF is known for each time-coherency trace, by using magnitude of coherency events for selecting a time T along the time-coherency trace, the corresponding velocity can be determined from the TVF.

The time-coherency traces can be represented in the form of a matrix in which each time-coherency trace is represented by a column, for example, $$
\begin{array}{cccc}
C_{T1, TVF1}, & C_{T1, TVF2}, & \ldots & C_{T1, TVFN} \\
C_{T2, TVF1}, & C_{T2, TVF2}, & \ldots & C_{T2, TVFN} \\
\cdot & \cdot & \cdot & \\
\cdot & \cdot & \cdot & \\
\cdot & \cdot & \cdot & \\
C_{TN, TVF1}, & C_{TN, TVF2}, & \ldots & C_{TN, TVFN}
\end{array}
\quad (1)
$$

Thus, each column in the matrix represents a set of coherency values at a plurality of times T1, T2, ..., TN for a selected TVF such as TVF1, TVF2, ..., TVFN. Thus, as used herein, the term time-coherency trace is used to refer to a trace displaying variations in coherency as a function of time for a plurality of times T along a trial velocity function f(T, V).

It will be appreciated that the result of velocity analysis and generation of time-coherency traces is a transformation of the CMP gather illustrated in FIG. 1A into a set of traces such as illustrated in FIG. 3 in which coherency variations are displayed as a function of time whereas in the original traces variations in amplitude of reflected signals are displayed as a function of time.

In accordance with certain aspects of the invention time-coherency traces for selected TVFs and for selected CMPs are displayed, for example, on a computer or workstation monitor. It will be apparent that matrix (1) stored in memory, for example, of a data processor is both a transformation of the original seismic traces and can be used to generate time-coherency traces. Use of computers and monitors for storing, transforming, storing, generating and displaying traces are well-known to those skilled in the art and those skilled in the art will be able to carry out the steps herein described.

Referring again to FIG. 3, as illustrated in traces $t_1-t_5$ high coherency events can be indicated by horizontal deviations in each time-coherency trace and time can be indicated by position on the vertical axis.

Referring again to FIG. 2, reference numeral 18 illustrates a step of generating a stacked trace section and step 20 allows a user to display the stacked trace section.

The stacked trace section display in accordance with the invention can be any section of stacked seismic traces or of stacked transformed seismic traces having events which effectively represent structural features in the subsurface. The stacked trace section can be a plurality of stacked time-coherency traces produced by summing a plurality of time-coherency traces for each CMP and displaying the stacked coherency traces in a section in the usual way as a function of CMP. Such a section is schematically illustrated by FIG. 5A. One of the unique aspects of this preferred embodiment of the invention is that, in addition to providing the explorationist with TVF panels from which velocities can be picked, the explorationist is also presented with a picture of structure (stacked section) produced from the same data which can be used for structural reference.

Alternatively, however, the display can be a section of raw seismic traces or a section of seismic data preliminarily corrected using an estimated velocity function or a section of stacked CMP gathers. Stacked sections can be readily generated from original seismic traces or from transformed seismic traces and in particular from time-coherency traces by those skilled in geophysical data processing. Further description herein is therefore not necessary.

Such a section can be displayed on a computer monitor as illustrated by steps 20 and 22 of FIG. 2 to permit an explorationist to evaluate whether the stacked sections sufficiently define structural events to be useful.

By step 24 the user can specify a range of CMPs and/or TVFs to be used in generating a set of TVF panels. By steps 26 and 28, then, the user can elect to generate and view TVF panels. The step of generating TVF panels is illustrated in reference to FIG. 4.

Figure 4:
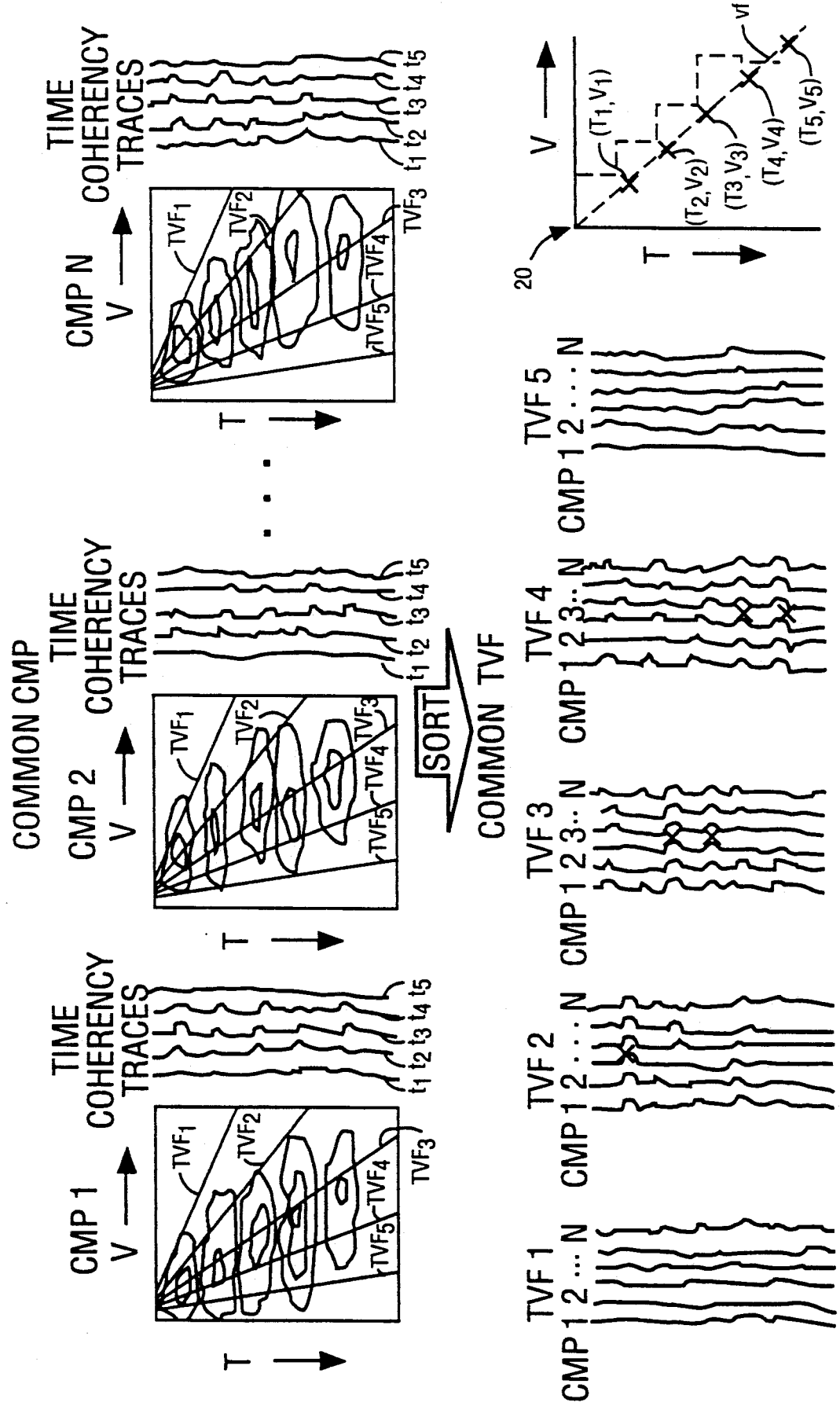
FIG. 4 schematically illustrates velocity spectra, TVFs and corresponding time-coherency traces of a plurality of CMPs at positions along a seismic line of exploration; and illustrates that time-coherency traces from plural CMPs can be sorted by TVF to produce TVF-sorted sets of time-coherency traces; and illustrates that TVF sorted sets of time-coherency traces can be displayed for multiple TVFs on a TVF by TVF basis in TVF panels and used for selecting coherency events having corresponding time, velocity data which can be used for generating a stacking velocity or other velocity function.

Referring now to FIG. 4, FIG. 4 illustrates that time-coherency traces can be generated for a selected set of TVFs for a selected set of CMPs and can be sorted by TVF to produce a plurality of sets of TVF-sorted time-coherency traces which can be displayed as TVF panels.

Thus, each of the CMPs 1, 2, ..., N along a seismic line of exploration is illustrated by a velocity spectrum having TVFs 1 through 5 thereon and corresponding time-coherency traces $t_1-t_5$. It can be seen that TVFs 1–5 are identical for the different CMPs but that the corresponding $t_1-t_5$ differ for each CMP corresponding to differences in coherency indicated by contoured lines in the respective velocity spectra. As illustrated, for each different TVF a set of time-coherency traces corresponding to CMP 1, CMP 2, ..., CMP N can be produced by sorting the set of time-coherency traces by selecting from each CMP the time-coherency trace corresponding to the TVF of interest.

The result for each TVF is a set of time-coherency traces comprising a time-coherency trace for each CMP of a selected set of CMPs which can be displayed together as a TVF panel. As illustrated, for example, for TVF1, a TVF panel includes a time-coherency trace for each of a range of CMPs illustrated as CMP1, 2, ..., N. The range of CMPs can be selected by step 24 of FIG. 2 from the full range of CMPs along the seismic line and can include the full set of CMPs or a subset of CMPs along the seismic line. The set of CMPs can be selected by step 24 of FIG. 2 to be a subset of adjacent or nonadjacent CMPs along the seismic line. Preferably the number of CMPs comprises 5 or more CMPs, most preferably 10 to 50 or more CMPs along the seismic line.

In accordance with the invention, TVF panels can be used to generate stacking velocity or other velocity functions. Since such velocity functions can vary along the seismic line, it may be desirable to generate TVF panels for different sets of CMPs at intervals along the seismic line to evaluate the variability of the function being investigated. The number of CMPs included in each panel, the number of panels and the frequency of examination of TVF panels along the seismic line can be readily selected by the person skilled in velocity analysis.

Each TVF panel can be displayed (see step 30 of FIG. 2) on a computer or workstation monitor as a function of TVF.

As illustrated by panels TVF1, TVF2,...,TVFN in FIG. 5B, each display of TVF panels can include a selected set of TVF panels. Typically, for example, a plurality of TVFs will be used in velocity analysis, such as in the range of 5 to 50 or more. However, for a given set of CMPs, certain TVFs may not provide useful information. According to the invention (see step 24 of FIG. 2), the user can select for each interval or set of CMPs along the seismic line a set of TVFs for use in generating corresponding TVF panels. Preferably a range of TVFs is selected which is effective for including the highest coherency events produced by velocity analysis.

Thus, referring again to the TVF1 and TVF5 panels illustrated in FIG. 4, it can be seen that the times and velocities defined by TVF1 and TVF5 are relatively ineffective (compared to the TVF2-TVF4 traces) for consistently generating any high coherency events during velocity analysis, indicating that TVF1 and TVF5 would not be significantly effective as a stacking velocity function for any of the CMPs shown in the TVF1 and TVF5 panels. Thus a user might by step 24 of FIG. 2 exclude TVF1 and TVF5 from the TVF panels without significant loss of information. TVF panels 2-4, however, are illustrated with high coherency events aligned horizontally adjacent points marked X.

Referring now to the TVF2 panel, it can be seen that the various time-coherency traces in TVF2 have a high coherency event at a time on the vertical axis indicated by symbol X, indicating that TVF2 would be a more effective stacking velocity function for that specific time for CMP3. It will be appreciated that each such high coherency value is associated with a particular set of CMPs, with a particular TVF, with a particular velocity value, and with a particular time value; and consequently that by selecting the high coherency event at a time t in the TVF2 panel, that the corresponding velocity can readily be determined from the trial velocity function TVF2. Hence, a time, velocity pair $(T_1, V_1)$ (see graph 20 of FIG. 4) representing the high coherency event in the time, velocity domain for the specific TVF and the particular time selected can be readily determined.

Referring now to the TVF3 panel, it can be seen that at times indicated by X there are also high coherency events for which TVF3 can be used to determine time, velocity pairs $(T_2, V_2)$ and $(T_3, V_3)$. Similarly referring to the TVF4 panel, high coherency events are indicated for which TVF4 can be used to determine time, velocity pairs, $(T_4, V_4)$ and $(T_5, V_5)$.

As illustrated by graph 20 these (T, V) pairs can be used to define for a given interval along the seismic line a time, velocity function in the time-velocity domain, for example, a stacking velocity function illustrated by dashed line vf.

Referring again to FIG. 2, step 32 represents the picking and generation of a velocity function such as vf from the TVF panels.

In FIGS. 3 and 4 only a relatively small number of CMPs and TVFs and corresponding time-coherency traces are illustrated. As indicated, however, in practicing the invention, the number of TVFs can range from 5 to 50 or more and CMPs can range from 5 or more to all of the CMPs along the seismic line for a typical velocity analysis. Thus, for displaying TVF panels 5 or more will suffice particularly where there exists prior knowledge of structure. Generally, however, a larger number of CMPs will be desirable for a zone of interest, preferably a preponderance or all of the CMPs in a zone of interest.

Figure 5:
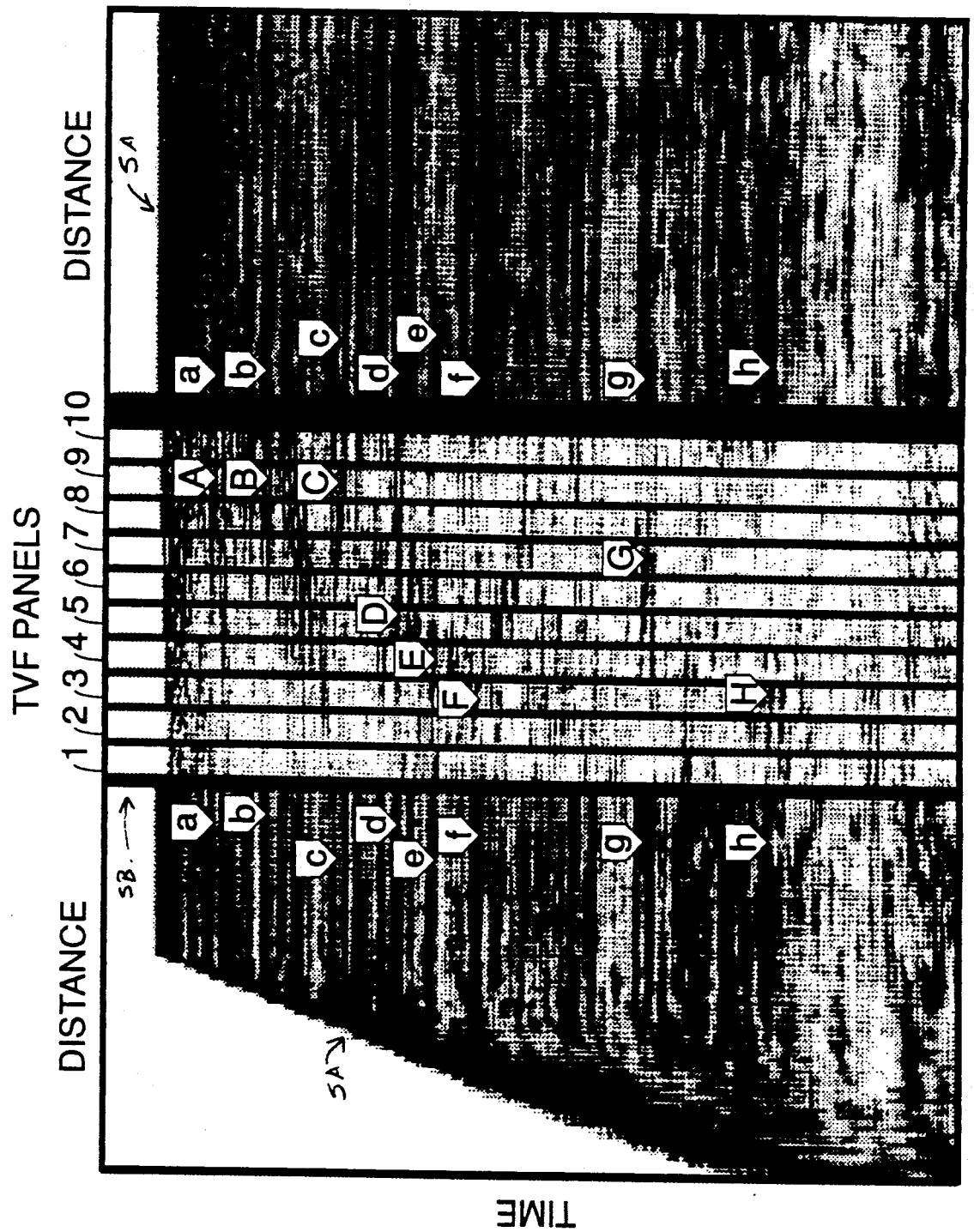
FIG. 5 illustrates a display of TVF panels of time-coherency traces superimposed on a stacked seismic section of time-coherency traces summed on a CMP-by-CMP basis useful for picking (T,V) points for generating a stacking velocity function.

For displaying the quantities of data, it is preferred to display coherency values by variations in a gray scale or color scale since such variations are readily detected by the human eye. FIG. 5 illustrates use of a gray scale for a set of real data. However any suitable display can be used.

Advantageously, the (T, V) pairs selected from TVF panels for generating the velocity function occur at travel times which are also representative of significant structures in the subsurface. To facilitate selecting (T, V) pairs representing significant structure, it is advantageous to display TVF panels in accordance with the invention juxtaposed with displays representing structural features, for example, stacked trace sections, preferably on the same time scale to make it easy to identify high coherency events on TVF panels which correspond to structural features in the stacked section.

Referring again to FIG. 2, steps 36, 38, 40 and 42 represents steps of choosing and displaying a stacked section and juxtaposed TVF panels and picking a velocity function therefrom.

Referring now to the displays of FIG. 5, 5A represents a portion of a stacked seismic section, for example, of stacked summed time-coherency traces and 5B illustrates a display of TVF panels in accordance with the invention juxtaposed with the stacked section 5A on the same time scale. It will be appreciated from FIG. 5 by those skilled in seismic data processing that high coherency events correspond generally to subsurface structural features. High coherency events in TVF panels corresponding to structures a, b,..., h are indicated by A, B,..., H respectively. From FIG. 5 it will be apparent that a TVF useful for one subsurface structure is not necessarily the best for other structures. Thus TVF9 is effective for subsurface structure represented by a, b, c; TVF7 is effective for g; TVF5 for d; TVF4 for e; and TVF3 for f and h.

When picking a velocity function from such as displays 30 or 40 of FIG. 2 the user can use for example a mouse as shown in FIG. 6 to select points in the TVF panels whether as illustrated in display 110 or as in display 114. As indicated, since the TVF panels and the stacked section have a common time scale, the user before selecting a coherent event in a TVF panel of 5B preferably ascertains by observation that the event has structural significance in the stacked section of 5A. Otherwise step 42 of FIG. 2 corresponds to step 32 discussed above.

FIG. 6 illustrates apparatus 100 for geophysical exploration in accordance with the invention comprising means for generating displays such as on monitor 106. The displays can be, for example, TVF panels 110, stacked seismic sections, or preferably composites of TVF panels and stack seismic sections 114.

According to various aspects of the invention, means functionally or positionally related to the coordinate system of a display is used for selecting high coherency events from TVF panels. This means can be any means which can select points in a coordinate system of the display and then input such points to a data processor for generation of (T, V) points useful for producing a velocity function in accordance with the invention. Such means can include a keyboard such as 118 for directly inputting coordinates or for controlling a cursor on the display for translation by the computer into coordinates; or can include other means positionally related to a coordinate system of the display, such as a mouse 116, a trackball, or a joystick; or can include means mapping a coordinate system for selection of points thereon corresponding to the points on a coordinate system of a display such as a digitizing tablet, and means such as light pens, touch sensitive screens, and the like.

Once a set of points is defined by such means, a programmed data processor can generate a function including such points by, for example, linear interpolation between the points, curve fitting, and the like, all of which can be readily accomplished by the skilled applications programmer in the seismic data processing arts from the descriptions herein. By step 44 of FIG. 2 such velocity functions may be stored and made available for further use by persons skilled in the arts of geophysical exploration.

The invention relates to an advantageous method of velocity analysis which can be used to particular advantage when other methods of velocity analysis are inadequate. The invention is particularly advantageous when used in conjunction with velocity analysis techniques employing TVFs since in that case, the TVFs and corresponding time, velocity, coherency values are already available for processing in accordance with the invention into TVF panels and stacked sections of time-coherency traces.

The invention has been illustrated in terms of a preferred embodiment but is not limited thereto but by the following claims interpreted and entitled to an appropriate range of equivalents in accordance with applicable principles of law.

What is claimed is:

1. A method for generating a time-velocity function for CMP (common midpoint) gathers comprising:
    for each of a plurality of CMP gathers along a seismic line of exploration generating a plurality of time-coherency traces, each time-coherency trace representing variation in coherency as a function of time for a respective selected TVF (trial velocity function);
    sorting the plurality of time-coherency traces by TVF, and generating sets of time-coherency traces, each set representing a plurality of CMPs for each selected TVF;
    displaying a plurality of the resulting TVF sorted sets of time-coherency traces as TVF panels;
    selecting points representative of time and velocity values using the resulting TVF panels; and
    generating a time-velocity function from the thus selected points.

2. The method of claim 1 wherein the displaying step comprises:
    selecting a subset of TVFs from the set of TVFs; and
    displaying for each TVF in the subset, a panel of time-coherency traces representing a plurality of CMPs.

3. The method of claim 1 wherein the displaying step comprises:
    selecting a subset of CMPs from the set of CMPs; and
    displaying for each TVF a panel of time-coherency traces representing the selected subset of 4. The method of claim 1 wherein the displaying step comprises:
    selecting a subset of TVFs from the set of TVFs;
    selecting a subset of CMPs from the set of CMPs; and
    displaying for each TVF in the subset a panel of time-coherency traces representing the selected subset of CMPs.

5. The method of claim 1 wherein the selecting step comprises:
    for each CMP of a selected set of CMPs summing a selected set of time-coherency traces and producing a set of stacked time-coherency traces;
    using the stacked time-coherency traces for generating a stacked section; and
    selecting points for generating a time-velocity function from TVF panels by selecting high coherency values in the TVF panels which occur at times corresponding to structural features in the stacked section.

6. The method of claim 2 wherein:
    the subset of TVFs comprises in the range of from 5 to 50 TVFs.

7. The method of claim 3 wherein:
    the subset of CMPs comprises at least 5 CMPs, optionally in the range of 5 to 50 CMPs along the seismic line of exploration.

8. The method of claim 4 wherein:
    the subset of TVFs comprises in the range of from 5 to 50 TVFs; and
    the subset of CMPs comprises in the range of 5 to 50 CMPs along the seismic line of exploration.

9. The method of claim 1 further comprising:
    generating a stacked seismic section having a time scale effective for user determination that time of occurrence of structural features is substantially the same as time of occurrence of high coherency events in TVF panels.

10. The method of claim 9 further comprising:
    generating a time velocity function based on points selected from TVF panels based on such determination.

11. An apparatus for generating a stacking or other velocity function for CMP (common midpoint) gathers comprising:
    means for generating from each of a plurality of sets of CMP gathers along a seismic line of exploration a plurality of time-coherency traces representing variation in coherency as a function of time for each of a plurality of selected TVFs (trial stacking velocity functions);
    means for sorting the plurality of time-coherency traces by TVF into sets of time-coherency traces of plural CMPs for each selected TVF;
    means for displaying a plurality of the resulting TVF sorted sets as TVF panels of time-coherency traces;
    means for selecting points representative of time and velocity values using the resulting TVF panels; and
    means for generating a time-velocity function from the thus selected points.

12. The apparatus of claim 11 comprising:
    means for selecting a subset of TVFs from the set of TVFs; and
    means for displaying for each TVF in the subset, a panel of time-coherency traces representing plural CMPs.

13. The apparatus of claim 11 comprising:
    means for selecting a subset of CMPs from the set of CMP; and
    means for displaying for each TVF in the subset a panel of time-coherency traces for the selected subset of CMP.

14. The apparatus of claim 11 comprising:
    means for selecting a subset of TVFs from the set of TVFs;
    means for selecting a subset of CMPs from the set of CMPs; and
    means for displaying for each TVF in the subset a panel of time-coherency traces for the selected subset of CMPs.

15. The apparatus of claim 11 wherein the means for selecting comprises:
    means for generating a stacked section comprising stacked CMP gathers; and means for selecting points for generating a time, velocity function from TVF panels by choosing high coherency values in the TVF panels which occur at times corresponding to structural features in the stacked section.

16. Method for geophysical exploration comprising:

conducting seismic exploration using CMP (common midpoint) exploration along a seismic line of exploration on earth's surface and generating a plurality of seismic traces and sorting the plurality of seismic traces into a plurality of CMP gathers;

generating a plurality of TVFs (trial stacking velocity functions) for each CMP gather and evaluating coherency for each TVF and generating a time-coherency trace F(T,C) for each TVF for each CMP;

generating a plurality of TVF panels with each panel comprising a plurality of coherency traces F(T,C) for a given TVF for a selected set of CMPs along the seismic line;

displaying a selected set of TVF panels adjacent the stacked section;

selecting (T,V) points by selecting T points on time-coherency traces in TVF panels, each T point having an associated V value determinable from the TVF;

wherein the T point selection is based on at least one of coherency values in TVF panels and structural significance in the stacked section of CMP gathers; and generating a velocity function from the thus selected (T,V) points.

* * * * *